United States Patent
Wassvik

(10) Patent No.: US 9,830,019 B2
(45) Date of Patent: Nov. 28, 2017

(54) TOUCH-SENSING LCD PANEL

(71) Applicant: FlatFrog Laboratories AB, Lund (SE)

(72) Inventor: Ola Wassvik, Brosarp (SE)

(73) Assignee: FLATFROG LABORATORIES AB, Lund (SE)

( * ) Notice: Subject to any disclaimer, the term of this patent is extended or adjusted under 35 U.S.C. 154(b) by 116 days.

(21) Appl. No.: 14/761,399

(22) PCT Filed: Jan. 16, 2014

(86) PCT No.: PCT/SE2014/050038
§ 371 (c)(1),
(2) Date: Jul. 16, 2015

(87) PCT Pub. No.: WO2014/112935
PCT Pub. Date: Jul. 24, 2014

(65) Prior Publication Data
US 2015/0346856 A1 Dec. 3, 2015

Related U.S. Application Data

(63) Continuation of application No. 13/742,958, filed on Jan. 16, 2013, now Pat. No. 8,963,886.

(51) Int. Cl.
*G09G 3/36* (2006.01)
*G06F 3/042* (2006.01)
*G02F 1/1333* (2006.01)

(52) U.S. Cl.
CPC .......... *G06F 3/042* (2013.01); *G02F 1/13338* (2013.01); *G06F 3/0428* (2013.01); *G06F 2203/04109* (2013.01)

(58) Field of Classification Search
CPC .. G09G 3/3696; G09G 3/3291; G09G 3/3614; G09G 3/3677; G09G 3/3648;
(Continued)

(56) References Cited

U.S. PATENT DOCUMENTS 7,042,444 B2 5/2006 Cok
7,202,856 B2 4/2007 Cok
(Continued)

FOREIGN PATENT DOCUMENTS

EP 1471459 A2 10/2004
EP 2336859 A1 6/2011
(Continued)

OTHER PUBLICATIONS

Cornelissen et al. "Injecting Light of High-Power LEDs into Thin Light Guides". Proc. SPIE 7652, International Optical Design Conference 2010, pp. 7652121-7652126, 2010.
(Continued)

*Primary Examiner* — Jennifer Nguyen
(74) *Attorney, Agent, or Firm* — Harness, Dickey & Pierce, P.L.C.

(57) ABSTRACT

A touch-sensing display panel, comprising an LCD unit including a backlight and a plurality of image-forming pixel elements arranged in a central region. A planar light guide with a first refractive index has a front surface forming a touch-sensing region and an opposite rear surface facing the LCD unit. A plurality of light emitters are emulated by passing light from the backlight through pixel elements of first selected portions of a peripheral region of the LCD unit into the light guide for propagation therein through total internal reflection, and a plurality of light detectors are connected to receive light from the light guide.

25 Claims, 7 Drawing Sheets

(58) Field of Classification Search
CPC ... G09G 2320/0214; G09G 2300/0876; G09G 2300/0819; G09G 2310/0251; H04N 13/0404; H04N 13/0438; H04N 13/0497
USPC .......................... 345/87–89, 102, 173–178
See application file for complete search history.

(56) References Cited

U.S. PATENT DOCUMENTS

| | | | |
|---|---|---|---|
| 7,432,893 | B2 | 10/2008 | Ma et al. |
| 7,613,375 | B2 | 11/2009 | Shimizu |
| 8,144,271 | B2 | 3/2012 | Han |
| 8,259,240 | B2 | 9/2012 | Han |
| 8,325,158 | B2 | 12/2012 | Yatsuda et al. |
| 8,373,679 | B2 | 2/2013 | Gepner et al. |
| 8,963,886 | B2 | 2/2015 | Wassvik |
| 2004/0140960 | A1 | 7/2004 | Cok |
| 2004/0212603 | A1 | 10/2004 | Cok |
| 2004/0251821 | A1 | 12/2004 | Cok |
| 2008/0074401 | A1 | 3/2008 | Chung et al. |
| 2008/0121442 | A1 | 5/2008 | Boer et al. |
| 2008/0150848 | A1 | 6/2008 | Chung et al. |
| 2008/0284925 | A1 | 11/2008 | Han |
| 2010/0060611 | A1 | 3/2010 | Nie |
| 2010/0079382 | A1 | 4/2010 | Suggs |
| 2010/0097348 | A1 | 4/2010 | Park et al. |
| 2010/0156848 | A1 | 6/2010 | Yatsuda et al. |
| 2010/0289755 | A1* | 11/2010 | Zhu .................. G06F 3/042 345/173 |
| 2010/0315379 | A1 | 12/2010 | Allard et al. |
| 2011/0069039 | A1 | 3/2011 | Lee et al. |
| 2011/0084939 | A1 | 4/2011 | Gepner et al. |
| 2011/0157097 | A1 | 6/2011 | Hamada et al. |
| 2011/0176327 | A1 | 7/2011 | Iwasaki |
| 2011/0199340 | A1 | 8/2011 | Aikio et al. |
| 2011/0221705 | A1 | 9/2011 | Yi et al. |
| 2011/0221997 | A1 | 9/2011 | Kim et al. |
| 2011/0234537 | A1* | 9/2011 | Kim .................. G06F 3/0412 345/175 |
| 2012/0086673 | A1 | 4/2012 | Chien et al. |
| 2012/0169666 | A1 | 7/2012 | Fan et al. |
| 2012/0182266 | A1 | 7/2012 | Han |
| 2012/0268427 | A1 | 10/2012 | Slobodin |
| 2012/0268701 | A1 | 10/2012 | Nemoto et al. |
| 2013/0021300 | A1 | 1/2013 | Wassvik |
| 2013/0127763 | A1 | 5/2013 | Gepner et al. |
| 2013/0127790 | A1 | 5/2013 | Wassvik |
| 2014/0071653 | A1 | 3/2014 | Thompson et al. |

FOREIGN PATENT DOCUMENTS

| | | | |
|---|---|---|---|
| WO | WO-2007/058924 | A2 | 5/2007 |
| WO | WO-2009/077962 | A2 | 6/2009 |
| WO | WO-2010/027385 | A2 | 3/2010 |
| WO | WO-2010/064983 | A2 | 6/2010 |
| WO | WO-2011/068761 | A1 | 6/2011 |

OTHER PUBLICATIONS

International Search Report and Written Opinion dated Dec. 4, 2013, issued in International Application No. PCT/SE2013/050330.
International Search Report and Written Opinion dated Oct. 8, 2013, issued in International Application No. PCT/SE2013/050024.
International Search Report and Written Opinion dated Apr. 25, 2014 issued in International Application No. PCT/SE2014/050038.
U.S. Office Action dated Feb. 13, 2014 issued in U.S. Appl. No. 13/742,958.
U.S. Office Action dated Aug. 22, 2014 issued in U.S. Appl. No. 13/742,958.
U.S. Office Action dated Dec. 23, 2013, issued in U.S. Appl. No. 13/548,749.
U.S. Office Action dated Jun. 4, 2014 issued in U.S. Appl. No. 13/548,749.
U.S. Office Action dated Jul. 17, 2015 issued in U.S. Appl. No. 14/604,502.

* cited by examiner

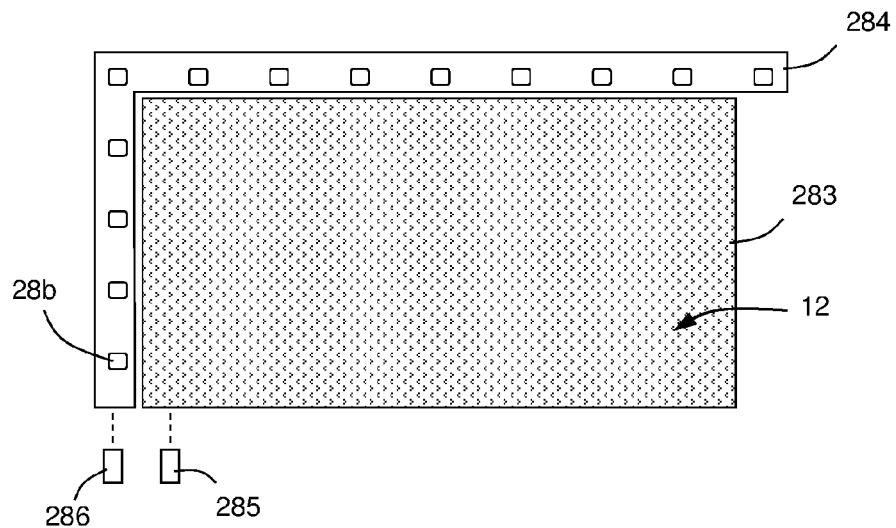
Fig. 15
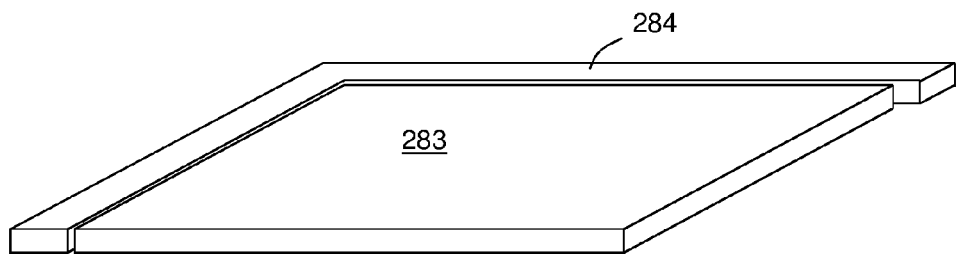
Fig. 16
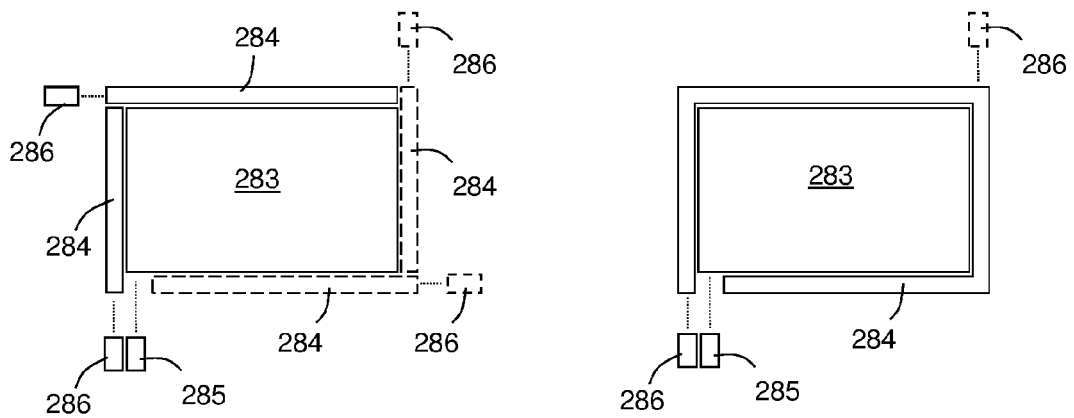
Fig. 17
Fig. 18

TOUCH-SENSING LCD PANEL

CROSS-REFERENCE TO RELATED APPLICATIONS

This application is a national phase under 35 U.S.C. §371 of PCT International Application No. PCT/SE2014/050038 which has an International filing date of Jan. 16, 2014, which is a continuation of U.S. utility patent application Ser. No. 13/742,958 filed Jan. 16, 2013.

TECHNICAL FIELD

The present invention relates to touch sensing systems implemented with a display, and especially to liquid crystal display devices that offer optical touch sensitivity.

BACKGROUND ART

Display devices with touch sensitivity are used today in a wide variety of applications such as touch pads in laptop computers, all-in-one computers, mobile phones and other hand-held devices, etc. It is often a desire to provide these electronic devices with a relatively large touch sensing display and still let the devices be small and thin.

There are numerous techniques for providing a display device with touch sensitivity, e.g. by adding layers of resistive wire grids or layers for capacitive touch-sensing or by integrating detectors in the display device. The major drawback of these techniques is that they reduce the optical quality of the display device, by reducing the amount of light emitted from the display or by reducing the number of active pixels of the display device.

U.S. Pat. No. 7,432,893 discloses a touch sensing system that uses FTIR (frustrated total internal reflection) to detect touching objects. Light emitted by a light source is coupled into a transparent light guide by a prism, then propagates inside the light guide by total internal reflection where after the transmitted light is received at an array of light detection points. The light may be disturbed (frustrated) by an object touching the light guide, whereby a decrease in transmitted light is sensed at certain light detection points. Providing a display device with this touch sensing system would add an undesired thickness and complexity to the display device.

WO2009/077962 also discloses a touch sensing system that uses FTIR to detect touching objects. Disclosed is a light guide with a tomograph having signal flow ports adjacent the light guide, the flow ports being arrayed around the border of the light guide. Light is emitted into the light guide by the flow ports and propagates inside the light guide by total internal reflection where after the transmitted light is detected at a plurality of flow ports. The light may be disturbed by an object touching the light guide. Providing a display device with this touch sensing system would add an undesired thickness and complexity to the display device.

A challenge connected to the art of optical touch-sensing systems is the provision of light emitters and detectors, and to the coupling of light in and out of the light guide. One advantageous way of implementing such a system is to employ a plurality of emitters and detectors dispersed along the perimeter of the display. However, including several emitters and detectors may entail increased requirements on alignment between these components, and on alignment with light coupling elements for connection to the light guide. A multitude of components will also add requirements on component reliability and assembly time.

SUMMARY

It is an object of the invention to at least partly overcome one or more of the above-identified limitations of the prior art. More specifically, it is an object of the invention to provide a solution for optical touch-sensing display panels, which limits the demand placed on the system in relation to light emitters. Another objective is to reduce the required thickness for providing touch sensitivity to a display device.

One or more of these objects, as well as further objects that may appear from the description below, are at least partly achieved by means of a touch-sensing display panel and an electronic device according to the independent claims, embodiments thereof being defined by the dependent claims.

A first aspect of the invention relates to a touch-sensing display panel, comprising an LCD unit including a backlight and a plurality of image-forming pixel elements arranged in a central region; a planar light guide with a first refractive index, having a front surface forming a touch-sensing region and an opposite rear surface facing the LCD unit; a plurality of light emitters, emulated by passing light from the backlight through pixel elements of first selected portions of a peripheral region of the LCD unit into the light guide for propagation therein through total internal reflection; a plurality of light detectors connected to receive light from the light guide.

In one embodiment said backlight is configured to pass light in the visible range to the image-forming pixel elements, and to pass light in the IR range to at least the first selected portions of the peripheral region.

In one embodiment said backlight comprises a backlight light guide and a light source connected to inject light within the visible range and within the IR range to the backlight light guide.

In one embodiment said backlight comprises a first light source connected to inject light within the visible range, and a second light source connected to inject light within the IR range.

In one embodiment said backlight comprises a common backlight light guide configured to pass light in both the visible range and in the IR range.

In one embodiment said backlight comprises a first backlight light guide connected to the first light source, and a second backlight light guide connected to the second light source.

In one embodiment the first backlight light guide covers at least said central region, and the second backlight light guide covers at least a portion of said peripheral region.

In one embodiment the first backlight light guide and the second backlight light guide are disposed in different layers.

In one embodiment the second backlight light guide is disposed at least partly outwardly of the first backlight light guide in a common plane.

In one embodiment said backlight is configured with structured areas under said first selected portions so as to selectively leak out light where it is wanted.

In one embodiment the touch-sensing display panel comprises an optical layer disposed at the rear surface of the light guide to cover a plurality of the image-forming pixel elements in at least the central region of the panel, wherein said optical layer is configured to reflect at least a part of the light from the emitters impinging thereon from within the light guide.

In one embodiment said optical layer has a second refractive index which is lower than the first refractive index.

In one embodiment said optical layer is an air gap.

In one embodiment said optical layer is a coating.

In one embodiment an extension portion of the optical layer is disposed over the light emitters, said extension portion having a third refractive index which is higher than the second refractive index.

In one embodiment the third refractive index is equal to or higher than the first refractive index.

In one embodiment the extension portion of the optical layer is also disposed over the light detectors.

In one embodiment the light emitters are coupled to emit light into the light guide, which light bypasses said optical layer.

In one embodiment said light detectors are coupled to receive light from the light guide, which light bypasses said optical layer.

In one embodiment said LCD unit comprises a TFT electrode layer, to which said light detectors are connected.

In one embodiment pixel elements of second selected portions of a peripheral region of the LCD unit are configured to pass light from the light guide to said light detectors.

In one embodiment a grid of propagation paths is defined across the touch-sensing region between pairs of light emitters and light detectors.

A second aspect of the invention relates to an electronic device comprising the touch-sensing display panel of any preceding claim, and a controller connected to the LCD unit for causing the pixel elements of said first selected portions to open in a certain pattern.

In one embodiment said controller is configured to cause the pixel elements to open in succession such that said emitters will act as flashed one by one.

BRIEF DESCRIPTION OF DRAWINGS

Embodiments of the invention will now be described in more detail with reference to the accompanying schematic drawings.

FIG. 15 shows a plan view of a variant of the embodiment of FIG. 13, with a common plane arrangement of two backlight light guides.

FIG. 16 shows a perspective view of the embodiment of FIG. 15.

FIGS. 17-18 show alternatives to the embodiment of FIG. 15, also with a common plane arrangement of two backlight light guides.

DETAILED DESCRIPTION OF EXAMPLE EMBODIMENTS

Figure 1:
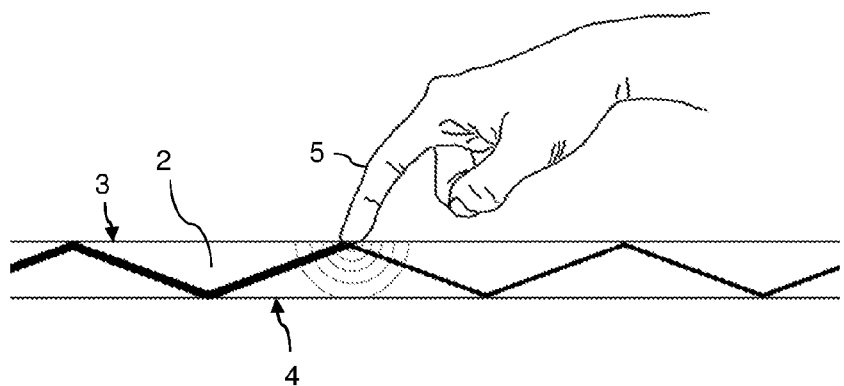
FIG. 1 is a side view of an object in contact with a light transmissive light guide to illustrate the use of FTIR for touch sensing.

The present invention relates to the use of optical techniques, specifically FTIR, for providing touch sensitivity to a display apparatus. More specifically, the invention provides a truly integrated touch-sensing display panel 1, operating by means of FTIR in a liquid crystal display (LCD) device. Throughout the description the same reference numerals are used to identify corresponding elements.

FIG. 1 illustrates the operating principle of a touch-sensing FTIR system. In the side view of FIG. 1, a beam of light is propagated by total internal reflection (TIR) inside a planar (two-dimensional) light guide 2. The light guide 2 comprises opposing surfaces 3, 4 which define a respective boundary surface of the light guide 2. Each boundary surface 3, 4 reflects light that impinges on the boundary surface from within the light guide 2 at an angle that exceeds the so-called critical angle, as is well-known to the skilled person. When an object 5 is brought sufficiently close to one of the boundary surfaces (here, the top surface 3), part of the beam may be scattered by the object 5, part of the beam may be absorbed by the object 5, and part of the beam may continue to propagate in the light guide by TIR in the incoming direction. Thus, when the object 5 touches the top surface 3, which forms a "touch surface", the total internal reflection is frustrated and the energy of the transmitted light is decreased, as indicated by the thinned lines to the right of the object 5. This phenomenon is known as FTIR (Frustrated Total Internal Reflection) and a corresponding touch-sensing device may be referred to as an "FTIR system".

Although not shown in FIG. 1, the FTIR system typically includes an arrangement of emitters and detectors, which are distributed along the peripheral region of the touch surface 3. Light from an emitter is introduced into the light guide 2 and propagates by TIR to one or more detectors. Each pair of an emitter and a detector defines a "detection line", which corresponds to the propagation path from the emitter to the detector. Any object that touches the touch surface along the extent of the detection line will thus decrease or attenuate the amount of light received by the detector. The emitters and detectors are typically arranged to define a grid of intersecting detection lines on the touch surface, whereby each touching object is likely to cause an attenuation of several non-parallel detection lines.

The arrangement of detectors is electrically connected to a signal processor, which acquires and processes an output signal from the arrangement. The output signal is indicative of the power of transmitted light at each detector. The signal processor may be configured to process the output signal for extraction of touch data, such as a position (e.g. x, y coordinates), a shape or an area of each touching object.

While FIG. 1 illustrates the working principle of FTIR touch as such, the invention relates to a touch-sensing display panel in which an FTIR touch-sensing mechanism is truly integrated with a display, as will be shown with reference to the subsequent drawings.

Figure 2A:
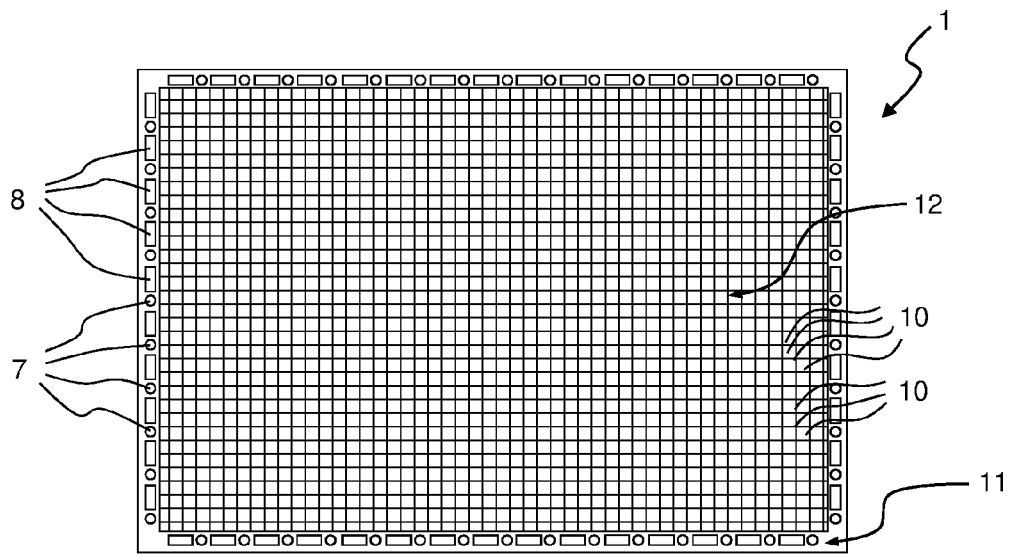
FIGS. 2A-2B show a top plan and a side view of an embodiment of the invention.
Figure 2B:
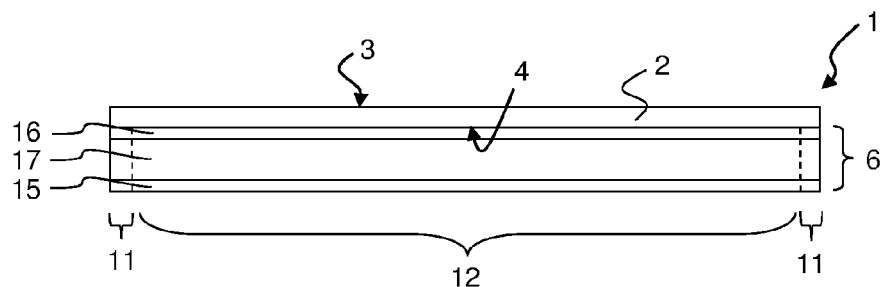

FIG. 2A is a top plan view and FIG. 2B is a side view of a touch-sensing display light guide 1 according to an embodiment of the invention. The touch-sensing display light guide 1 is implemented as a combination of a light transmissive light guide 2 that defines a front touch surface 3, and a dual-function display pixel matrix 6 which is configured to both display images through the front surface 3 and provide touch sensitivity to the front surface 3 via FTIR.

As seen in the plan view of FIG. 2A, a plurality of emitters 7 and detectors 8 (collectively referred to as "touch-sensor elements") are arranged in interleaved fashion underneath a peripheral region 11 of the light guide 2. It should be noted, though, that interleaved arrangement is merely one example of positioning the emitters 7 and detectors. Another example may be to arrange emitters along two sides, and detectors along the other two sides, of the panel 1. In the drawings, for illustrative purposes only, emitters 7 and detectors 8 are represented by circles and rectangles, respectively. Furthermore, a center region 12 of the light guide 2 is aligned with a matrix of image-forming elements or picture elements ("pixels" or "pixel elements") 10 that define a display area for displaying visual images in monochrome or color. The pixels 10, which are indicated as a matrix of square elements in FIG. 2A, may be formed by LCD (Liquid Crystal Display) with internal illumination ("backlighting") or TFT-LCD (Thin Film Transistor Liquid Crystal Display).

As seen more clearly in FIG. 2B, the display device 6 generally comprises a rear electrode (e.g. an anode) 15, and a front electrode (e.g. a cathode) 16, and an intermediate structure 17. The front electrode layer 16 is transparent. The pixels 10 of the display area may be defined by patterning of the electrode layers 15, 16, each pixel 10 may include one or more sub-pixels (not shown), e.g. such that the sub-pixels emit red, green and blue light, respectively.

Embodiments of the invention are based on the insight that the emitters 7 may be integrated into the display unit 6, and be formed by the same technology as used for producing images in the display area. Furthermore, the transparent display cover, which covers the pixel elements, may also be used as a light guide. As such, various embodiments of the invention may be realized with no addition of thickness or bulkiness at all. As used herein, an "integrated" emitter/detector 7, 8 is to be construed as an emitter/detector 7, 8 that is integrally formed on or in a substrate, which typically is a composite substrate comprising a plurality of layers. In FIG. 2B, the integration is indicated by dashed lines indicating that the display unit 6 is functionally (not physically) separated into a peripheral region 11 with emitters 7 and detectors 8 and a center region 12 with pixels 10, where the emitters 7, detectors 8 and pixels 10 are integrally formed using a common substrate. Each emitter 7 is configured to generate a cone of light in any suitable wavelength region. In one embodiment, the emitter 7 generates light that is invisible to the human eye, preferably in the infrared (IR) or possibly in the ultraviolet (UV) region. Each detector 8 is configured to be responsive to the light emitted by emitters 7.

Compared to the prior art as described in the background section, embodiments of the invention make is possible to provide touch sensitivity to a display apparatus essentially without adding to the thickness of the display apparatus. Furthermore, the manufacturing cost may be reduced since there is no need for a separate mounting operation for attaching emitters 7 and detectors 8. As will be further exemplified below, the emitters/detectors 7, 8 may be formed from functional structures also present in the display unit for the operation of the pixels 10. This means that the emitters 7 and detectors 8 may be manufactured by the same or a similar process as the pixels 10, whereby the added manufacturing cost may be minimal. It is also to be noted that the number of emitters 7 and detectors 8 that need to be added is comparatively small compared to the number of pixels of a typical display apparatus. For example, a 3.5" display may be provided with about $10$-$10^2$ emitters and detectors, while the number of pixels is typically in the order of about $10^5$-$10^6$. Still further, the touch sensitivity may be added without impairing the quality of images displayed in the display area, since the need to add touch-sensing layer(s) to the display area or integrate light detectors among the pixels within the display area is obviated.

Furthermore, by integrating the emitters/detectors 7, 8 at the peripheral region 11 of the display unit 6, it is possible to omit separate contacting of the emitters/detectors 7, 8. Instead, they may be contacted and electronically controlled in the same way as the pixels 10. For example, a data bus structure or an electronics backplane for supplying control signals to the pixels 10, to selectively control the light emitted by the pixels 10, may also be used to supply control signals to the individual emitters 7 and detectors 8 and/or to retrieve output signals from the individual detectors 8.

FIG. 2A indicates that the peripheral region 11 contains only emitters 7 and detectors 8, and thus is free of pixels 10. However, it is certainly possible to include pixels 10 also in the peripheral region 11, if desired, as will be described further below.

Figure 3:
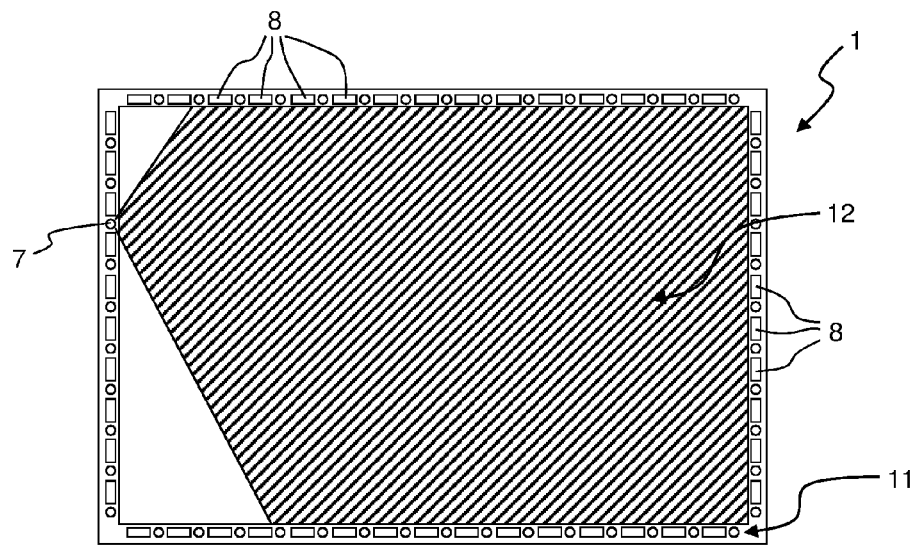
FIG. 3 is a top plan view of an embodiment with one activated emitter.

FIG. 3 is a top plan view to further illustrate the operation of the touch-sensing display light guide 1. For reasons of clarity, the pixels have been omitted. As shown, one emitter 7 is activated to emit an expanding beam of light. The emitted beam, or at least part thereof, is coupled into the light guide 2 such that it propagates by TIR across the touch surface 3, while expanding in the plane of the light guide 2 away from the emitter 7 (indicated by the hatched area). Such a beam is denoted a "fan beam" herein. Thus, each fan beam diverges from an entry or incoupling site, as seen on a top plan view. Downstream of the touch surface 3, the propagating light is coupled out of the light guide 2 and received by a subset of the detectors 8. As noted above, a detection line is formed between the emitter 7 and each of the detectors 8 that receive the fan beam. It is realized that a large number of detection lines may be generated by activating each of the emitters 7 and measuring the power of received light at the detectors 8 for each emitter 7. Depending on implementation, the emitters 7 may be activated in sequence or concurrently, e.g. by implementing the coding scheme disclosed in WO2010/064983.

Preferably, the light guide 2 is included as a transparent substrate during manufacture of the display pixel matrix 6, e.g. as a backing for supporting the front electrode 16. Generally, the light guide 2 may be made of any material that transmits a sufficient amount of radiation in the relevant wavelength range to permit a sensible measurement of transmitted energy. Such material includes glass, poly(methyl methacrylate) (PMMA), polycarbonates (PC), PET (poly(ethylene terephthalate)) and TAC (Triallyl cyanurate). The light guide 2 may be flat or curved and may be of any shape, such as circular, elliptical or polygonal. It is possible that the light guide 2 is comprised of plural material layers, e.g. for the purpose of scratch-resistance, anti-fingerprint functionality, anti-reflection or other functional purpose.

It is realized that the process for manufacturing the display unit 6 may be adapted to add a layer of lower index of refraction between the electrode layer 16 and the transparent backing, i.e. the light guide 2, if needed to sustain light propagation by TIR therein. This will be described further below in general terms and with reference to some exemplary embodiments with reference to FIG. 10. In addition, reference will now be made to FIGS. 4-7. In the priority document U.S. application Ser. No. 13/742,958 filed on Jan. 16, 2013, certain embodiments are disclosed relating to OLED displays, with reference to corresponding drawings. However, these drawings primarily discloses the presence, function, and character of an optical layer 21 disposed over the central region 12, which is applicable to embodiments of the touch-sensing LCD panel of present invention too, as is also clearly outlined in said priority document. For this reason, these drawings and the corresponding description are included herein too, since they are usable for understanding the invention.

Figure 4:
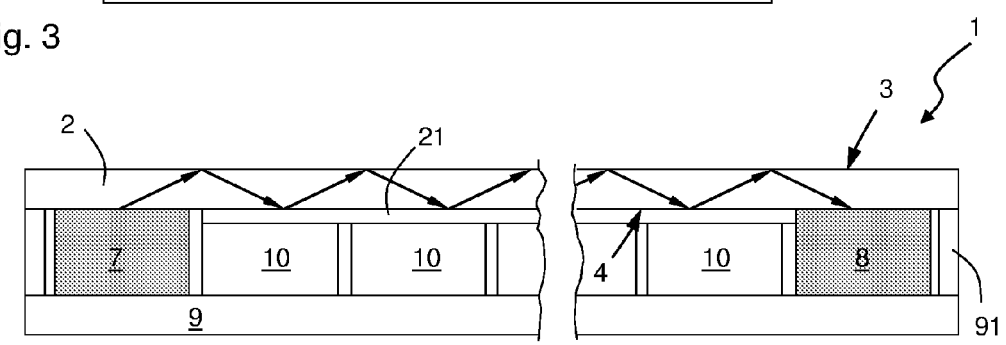
FIG. 4 is a side section view of a system including an OLED display unit, useful for understanding the invention.

FIG. 4 shows an embodiment wherein a cross-section of a touch-sensing display panel 1 is disclosed, with separate pixel elements 10 indicated at the central region of the panel. At the peripheral region the emitters 7 and detectors 8 are arranged, one of each shown in the drawing. The emitters 7 and detectors 8 are preferably formed integrally with the image-forming pixels 10. In the specific example shown in FIG. 4, the emitter 7 and detector 8 are OLEDs, as are the image-forming pixel elements 10. In an embodiment of the invention, the image-forming pixel elements 10 and at least the emitter 7 and preferably also detector 8 include different portions of a common LCD panel, as will be more specifically described further below. Nevertheless, the purposive use of the emitter 7 and detector 8 on the one hand, and the image-forming pixel elements 10 on the other hand, are quite different. The image-forming pixels 10, i.e. the display pixels, are configured to shine light out from the display panel 1, preferably in a wide cone angle but most importantly straight up (in the drawing), which would normally represent the best viewing angle for an observer. The emitter 7, however, will only be useful if its light is captured within the light guide 2 to propagate with TIR towards the detector 8. As a consequence, the part of the light emanating from the emitter 7 that goes straight up will be lost. However, a good part of the light will impinge on the front surface 3, from the inside of the light guide 2, in a wide enough angle to be deflected by TIR. The problem is that since the refractive index of the image-forming pixels 10 normally is higher than the index of the light guide 2, the light would escape downwards through the pixels 10 after reflection in the front surface 3. For this purpose, an optical layer 21 is disposed between the rear surface 4 of the light guide 2 and the image-forming pixels 10. In one embodiment this optical layer 21 is made from a material which has a refractive index $n_1$ which is lower than the refractive index $n_0$ of the light guide 2. That way, there will be TIR in the light guide 2 in both the front surface 3 and the rear surface 4, as indicated by the arrows, provided that the angle of incidence is wide enough. As an example, the optical layer 21 may be provided by means of a resin used as a cladding material for optical fibers. Such a resin lay may be provided on the substrate 2 before deposition of the electrode and organic layers. Another example of an optical layer 21 with a lower refractive index is an air gap 21, as will be described further below with reference to FIG. 10.

In another embodiment, the optical layer 21 is a wavelength-dependent reflector. Particularly, reflection of the emitter light in the rear surface 4 is obtained by providing an optical layer 21 which is at least partly reflective for the emitter light, while at the same time being highly transmissive for visible light. As an example, such an optical layer 21 may be provided by means of a commercially available coating called IR Blocker 90 by JDSU. This coating 21 has a reflectivity of up to 90% in the NIR, while at the same time being designed to minimize the effect on light in the visible (VIS) range to not degrade the display performance of the touch system, and offers a transmission of more than 95% in the VIS. It should be noted that there are also other usable available types of coatings, IR Blocker 90 being mentioned merely as an example. This type of wavelength-dependent reflectors are typically formed by means of multi-layer coatings, as is well known in the art. In an embodiment of this kind, light from the emitters 7 will propagate by TIR in the front surface 3 and by partial specular reflection in the rear surface 4.

It should be noted that the drawings here do not represent any realistic scale. The thickness of the light guide front glass 2 may be dependent on the size of the panel 1 and what it intended to be used for, i.e. the environment it will be used in. In one embodiment, the light guide may be in the order of 200-500 µm thick. The optical layer 21, though, need not be thicker than 1-5 µm to provide the cladding effect of realizing TIR in the rear surface 4 of the light guide 2.

Figure 5:
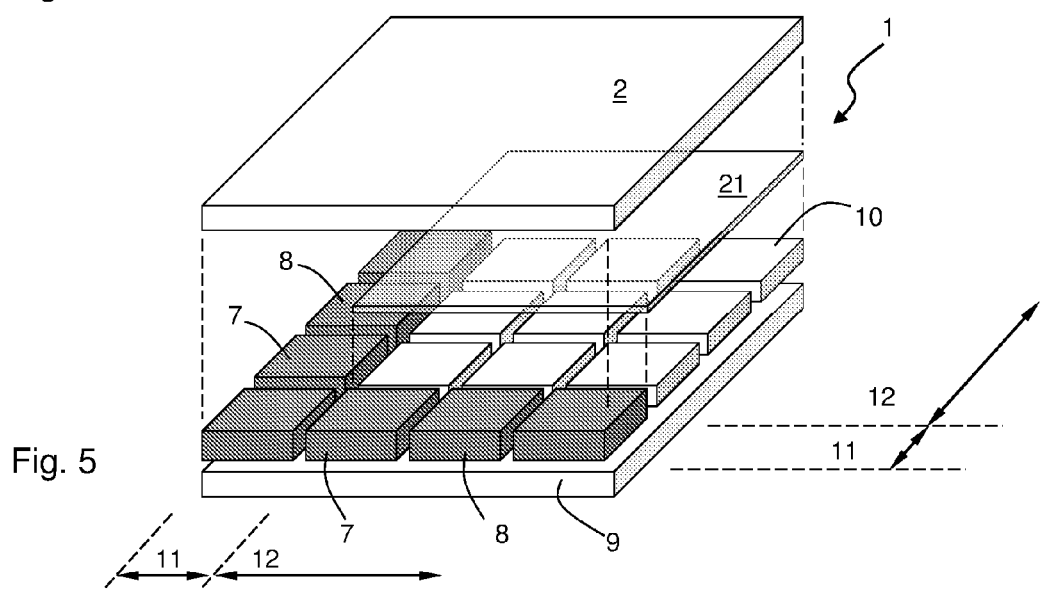
FIG. 5 is a perspective view of a cutout corner portion of the system of FIG. 4

FIG. 5 shows quite schematically a corner portion of a touch-sensing display panel 1 according to an embodiment. For the sake of simplicity, the peripheral seal 91 is left out in this drawing. The lower left corner in the drawing represents an outer corner of the panel 1, whereas the right and upper edges are to be understood as cutout from a larger panel 1. Emitters 7 and detectors 8, shown in grey, are arranged along the peripheral region 11, and the optical layer 21 is provided to cover the central region 12 of the panel 1 and the image-forming pixels 10 arranged at the central region 12. In an alternative embodiment (as can be seen in FIG. 8), image-forming pixels 10 are also present in the peripheral region 11 among the emitters 7 and detectors 8. Also, the peripheral region 11 may comprise more than one row of pixels. In addition, the optical layer 21 may cover also such image-forming pixel elements 10 provided in the peripheral region 11, in addition to covering the central region 12. It should be understood that FIG. 5 (and FIG. 7) only schematically show the different elements in a separated manner in order to clearly point out those elements, it shall not to be understood as an assembly instruction or the like.

Figure 6:
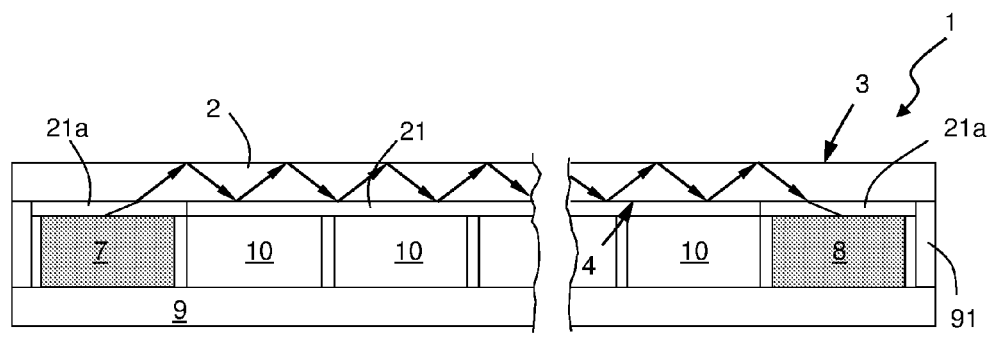
FIG. 6 is a side section view of variant of the system of FIG. 4.
Figure 7:
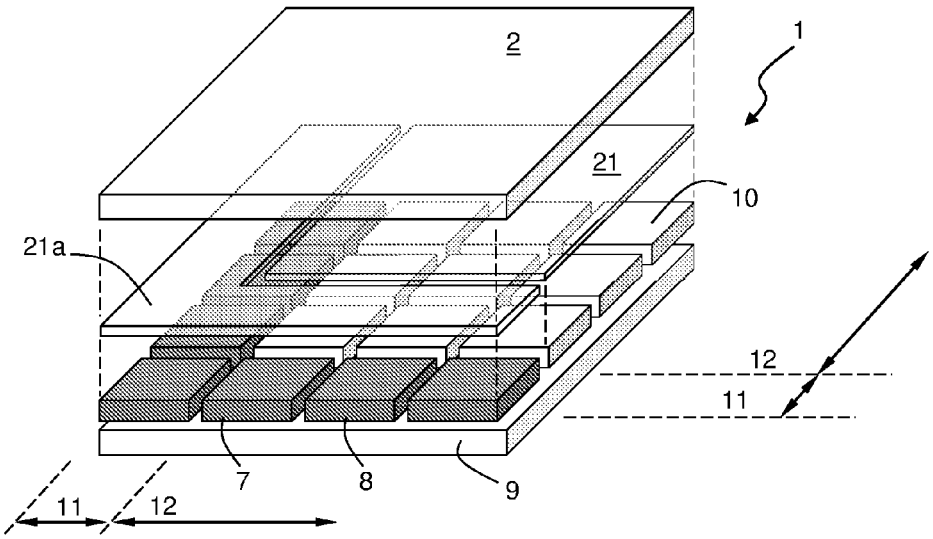
FIG. 7 is a perspective view of a cutout corner portion of the system of FIG. 6
Figure 8:
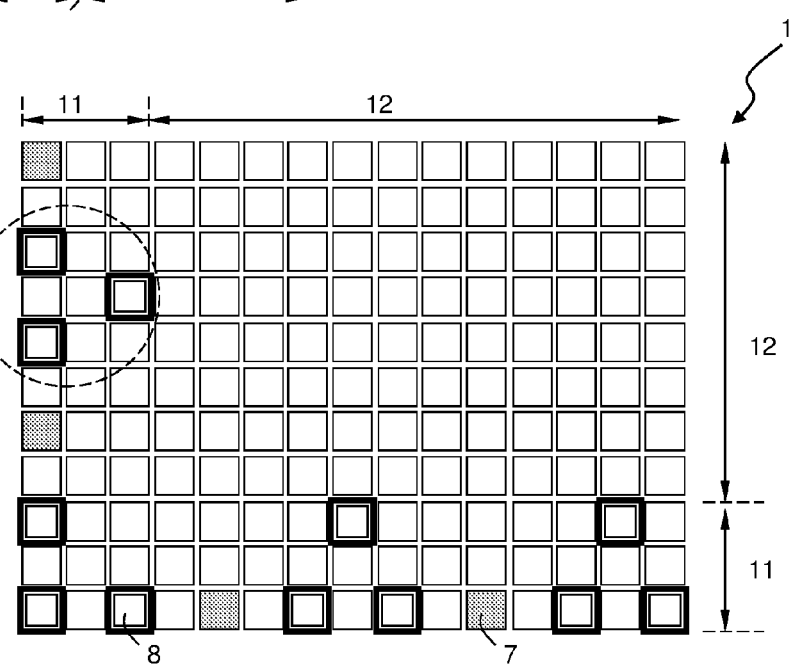
FIG. 8 is a top plan view of an embodiment with plural grouped detectors.

FIGS. 6 and 7 show an alternative embodiment, in which an extension portion 21a of the optical layer 21 is provided over the emitters 7 and detectors 8. The extension portion 21a preferably has substantially the same thickness as the optical layer 21. This extension portion 21a has a refractive index $n_2$ which is higher than the refractive index $n_1$ of the optical layer 21. This way, light that is injected into the light guide 2 through the extension portion 21a may still be reflected in the rear surface 4 where it faces the optical layer 21, provided that the angle of incidence is large enough. The refractive index $n_2$ of the extension portion 21a may e.g. be the same as the refractive index $n_0$ for the light guide 2. Alternatively, a material for the extension portion 21a may be chosen such that its refractive index lies between the refractive index for the light guide 2 and the refractive index for the emitter 7 and/or the detector 8.

In the embodiment shown in FIG. 7, which also shows a cutout lower left corner portion of a panel 1, the extension portion 21a runs as a frame portion covering the entire peripheral region. As an alternative, where image-forming pixels 10 are disposed also in the peripheral region, the optical layer 21 may be disposed over such image-forming pixel elements in the peripheral region too.

FIG. 8 schematically shows a top view of a lower left cutout corner portion of a panel 1 in accordance with an embodiment of the invention. In this embodiment, emitters 7 are shown in grey and are located in the peripheral region 11. Detectors 8 are marked with a double frame. The optical layer 21 is not included in the drawing, but shall be understood to cover at least all of the image forming elements 10 in the central region 12, and possibly also some or all of the image forming elements 10 in the peripheral region 11. If devised in accordance with the embodiment described with reference to FIGS. 6 and 7, an extension portion 21a is also employed to cover the emitters 7 and the detectors 8. FIG. 8 also illustrates how several detectors 8 can be functionally grouped (in the drawing also physically grouped) into a subset 80 to act as one larger detector. This way the light-sensing detector surface can be increased, and be operated as having its center between the detectors 8 of the subset 80. FIG. 8 also shows that the peripheral region 11, in some embodiments, may include more than one row of pixels.

Figure 9:
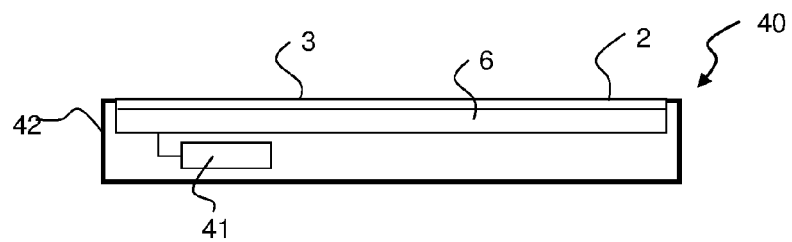
FIG. 9 is a section view of a touch-sensing display apparatus according to an embodiment of the invention.

FIG. 9 is a section view of a touch-sensing display apparatus 40, which comprises the display panel 1, including the light transmissive light guide 2 and a pixel matrix 6, and a signal processor 41, which are arranged in an enclosure 42 such that the light guide 2 forms a transparent front cover of the display apparatus 40. The signal processor 41 is a processing element (or means) which is connected to the display panel 1 so as to transmit control signals to the pixels, the emitters and the detectors, as well as to acquire output signals from the detectors. The signal processor 41 is also operable to generate and output touch data calculated based on the output signals. It is to be understood that the signal processor 41 may alternatively be implemented as a dedicated controller for the pixels and a dedicated controller for the emitters and the detectors.

It is to be understood that the display apparatus/display unit may form part of any form of electronic device, including but not limited to a laptop computer, an all-in-one computer, a handheld computer, a mobile terminal, a gaming console, a television set, etc. Such an electronic device typically includes a processor or similar controller that may be connected to control the display panel 1 to display information content within at least part of the touch surface 3 and to provide touch sensitivity within the touch surface 3. The controller may be implemented to control the display panel 1 via the signal processor 41, or it may implement part or all of the functionality of the signal processor 41.

Figure 10:
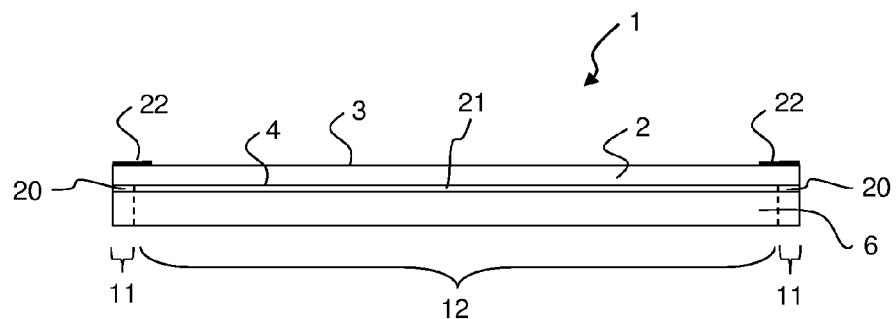
FIG. 10 is a section view of another embodiment of the invention.

Reference will now be made to the embodiment of. FIG. 10, illustrating a side view of an FTIR system of a combined display and touch-sensing panel 1, formed by attaching a light guide 2 to a display 6. The light guide 2 may be bonded to the display unit 6 by means of an adhesive, such as an optical adhesive. In one embodiment, the light guide 2 is laminated onto the display unit 6. To enable the light from the emitters 7 to be coupled into and out of the light guide 2 at the peripheral region 11, while enabling the light to propagate by TIR across the light guide above the center region 12, different adhesives may be used in the peripheral region 11 and the center region 12, as indicated by reference numerals 20, 21. Specifically, the adhesive 21 in the center region 12 may be selected to have an lower index of refraction lower than the light guide 2, while the adhesive 20 in the peripheral region 11 may be selected to have an index of refraction that is higher or substantially equal to the index of refraction of the light guide 2.

In a variant, the light guide 2 is attached by an adhesive 20 to the display unit 6 at the peripheral region 11 only and arranged with an air gap 21 to the center region 12 of the display unit 6. It is currently believed that an air gap of at least about 2-3 μm is sufficient to enable propagation by TIR in the light guide 2. This variant may facilitate removal and replacement of the light guide 2 in the course of service and maintenance.

It is also conceivable that the light guide 2 is attached to the display unit 6 via a spacer 20 of solid transmissive material. The spacer may be bonded to the light guide 2 and the display unit 6, respectively, by thin adhesive layers, such that the coupling of light is controlled by the index of refraction of the spacer 20 rather than the adhesive. In analogy with the above, the spacer 20 may be located at the peripheral region 11 only, or spacers 20, 21 with different index of refraction may be located at both the peripheral region 11 and the center region 12.

In any case, it should be understood that the element 20, whether an adhesive or a spacer, corresponds to extension layer 21a of FIGS. 6 and 7.

The combined touch-sensing display panel FTIR system 1 may also include structures configured to re-direct the light emitted by the emitters 7, e.g. to reshape the emitted cone of light so as to increase the amount of light coupled into the light guide 2 in a desired fashion. For example, the emitted light may be redirected so as to form the fan beam in the plane of the light guide 2, as shown in FIG. 3, and/or the emitted light may be redirected to increase the amount of light that is trapped by TIR in the light guide 2. These light-directing structures may be included in the above-mentioned spacer 20, or the portion of the surface 4 that faces the peripheral region 11 of the display unit 6, or the peripheral region 11 of the display unit 6 itself. Similar light-directing structures may be included between the light guide 2 and the detectors 8, so as to re-direct outcoupled light onto the detectors 8. Generally, the light-directing structures may be said to define the field of view of the emitter/detector 7, 8 inside the light guide 2. The light-directing structures may be in the form of a micro-structured elements, such as but not limited to, reflectors, prisms, gratings or holographic structures. The micro-structured elements may be etched, printed, hot embossed, injection molded, pressure molded or otherwise provided between the emitters/detectors 7, 8 and the light guide 2. One approach for coupling the LEDs to the light guide panel is proposed in the article "Injecting Light of High-Power LEDs into Thin Light Guides", by Cornelissen et al, published in Proc. SPIE 7652, International Optical Design Conference 2010, pp 7652121-7652126, 2010. According to this approach, the top surface of the LED is modified to have a rough surface behaving like a Lambertian reflector. A dielectric multilayer filter is deposited on the bottom of the light guide panel, and the top surface of the LED is optically coupled to the filter by a silicone adhesive. The filter is optimized to only transmit light emitted from the LED at angles larger than the critical angle at the interface between the light guide and its neighboring optical layer. The purpose of the multilayer is thus to only transmit light that can propagate in the light guide. The light emitted at smaller angles is reflected back toward the rough LED surface where it is subsequently recycled by reflection and redistribution.

The light-directing structures may be omitted, whereby part of the emitted light will pass through the light guide 2 without being trapped by TIR. Selected parts of the front surface 3 of the light guide 2, e.g. above the peripheral region 11, may be provided with a coating or cover 22, as will be described in more detail below, to prevent such light from passing the front surface 3.

With or without light-directing structures, it may be desirable to implement stray light reduction measures. In one example, the edge surface of the light guide 2 and/or the portion of the surface 3 above the peripheral region 11 may be provided with surface structures that prevent light from the emitters from being reflected back into the light guide 2. Useful anti-reflective surface structures include diffusers and light-absorbing coatings.

In a variant, surface structures are provided on the edge surface of the light guide 2 and/or the portion of the surface 3 above the peripheral region 11 to re-direct light from the emitters into the light guide 2 for propagation by TIR. It is also possible that the edge surface is formed with a suitable bevel to re-direct the light. Such surface structures may include light-reflective coating(s) and/or micro-structured elements, and may implement or be part of the above-mentioned light-directing structures.

FIG. 10 further illustrates a cover frame 22, a feature which may be included in any one of the other described embodiments as well. The cover frame 22 is disposed to cover the peripheral region 11, and possibly also extend a portion into the central region 12. The cover frame 22 may fulfill one or more of three different purposes.

As noted above, a surface of the cover frame 22, facing the light guide 2, may be configured to reflect light from the emitter 7 such that it may propagate in the light guide 2 rather than escape. As an example, a diffuser may be used for this purpose, which will reflect a part of the emitter light in angles that may satisfy the requirements for TIR in the light guide 2.

Secondly, the cover frame 22 may hide any structures in the peripheral region 11 from a user, particularly if only the central region 12 is used as an image display. For this purpose the cover frame 22 should be opaque to visible light.

As a third purpose, the cover frame 22 may be configured to block out ambient light from reaching the detectors 8. For this purpose, the cover frame 22 should be opaque to the operating wavelength of the touch-sensing system, i.e. the light detected by the detectors 8 from the emitters 7 to determine the occurrence of a touch. As mentioned, also the FTIR system may make use of visible light, but in a preferred embodiment NIR radiation is employed.

The cover frame 22 may e.g. be provided by means of a thin metal sheet. It may be provided as a separate element or form part of a housing 42 or bracket for holding the display panel 1. In another embodiment, the cover frame 22 may be implemented as a coating or film, in one or more layers, on the front surface 3. For example, an inner layer facing the front surface 3 may provide specular and possibly partly-diffuse reflectivity, and an outer layer may block ambient and/or visible light. In one embodiment, the cover frame 22 may comprise a chromium layer provided onto the top surface 3, to obtain a surface towards the panel light guide 2 which is at least partially specularly reflective to light in the emitter wavelength. In addition, the cover frame 22 may comprise an outer layer, which is substantially black to block visible light, by oxidizing the upper surface of the chromium layer. In other embodiments, other metals, with corresponding oxides, may be used, such as aluminum, silver etc. In yet other embodiments, the specularly reflecting lower layer may be provided by means of a metal, whereas an upper layer may be provided by means of paint, e.g. black paint.

In any case, the cover frame 22 is preferably substantially flat, and should be as thin as possible while providing the desired benefits of blocking IR light and visible light. In yet another embodiment, the cover frame may be disposed as an opaque frame layer between two different layers of the light guide 2, rather than on the front surface 3. This way it may be possible to obtain a flush front surface 3. In a further embodiment the cover frame 22 is disposed at the rear surface 4 of the light guide 2, and is configured to block visible light but to transmit IR. This way, the peripheral region structures are covered but light from the emitters 7 may still pass through the cover frame 22 to the light guide 2, and subsequently out through the cover frame to the detectors 8.

Figure 11:
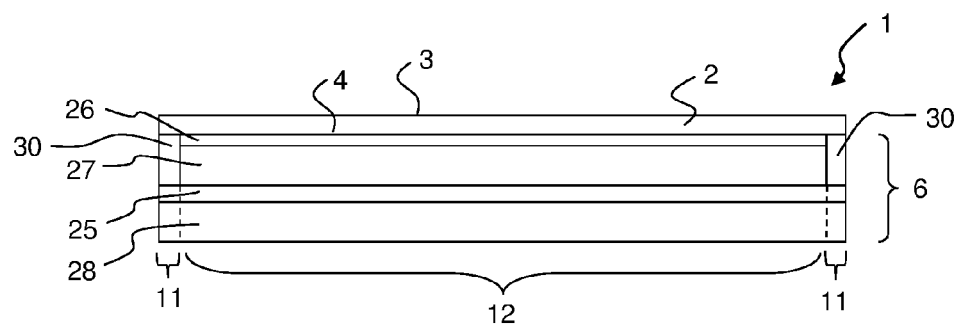
FIG. 11 is a section view of an embodiment including a TFT-LCD display unit.

FIG. 11 is a section view of an embodiment in which the display unit 6 is based on liquid crystal technology, and specifically with the display unit 6 being a TFT-LCD. The display unit 6 comprises a rear electrode layer 25, a front electrode layer 26 and an intermediate liquid crystal (LC) structure 27. The electrode layers 25, 26 are transparent and comprises a respective polarizer. The rear electrode layer 25 comprises a pixel-defining electrode structure and a TFT active matrix for pixel selection, whereby the polarization of the LC structure 27 may be selectively controlled (addressed) at the location of each pixel. The front electrode layer 26 may be implemented as a common electrode and may also comprise color filters, as is known in the art. In the illustrated embodiment, the display unit 6 further comprises a backlight 28, which projects light for transmission through the electrode layers 25, 26 and the LC structure 27. Like in the foregoing embodiments, a light transmissive light guide 2 is arranged to define a front touch surface 3. In effect, the light guide 2 may be a sandwich structure including both color filters and polarizer, or simply be a planar cover lens, dependent on at which layer forms the rear surface 4 for reflection of the propagating light. In the illustrated embodiment, the rear electrode layer 25 is designed with detectors in its peripheral region 11. The detectors may e.g. be integrated as light-sensitive TFTs. Further details on TFT-LCDs and light-sensitive TFTs are e.g. found in WO2007/058924 and US2008/0074401, which are incorporated herein by reference.

It is to be understood that the above discussion in relation to FIG. 10 is equally applicable to the embodiment in FIG. 11.

Figure 12:
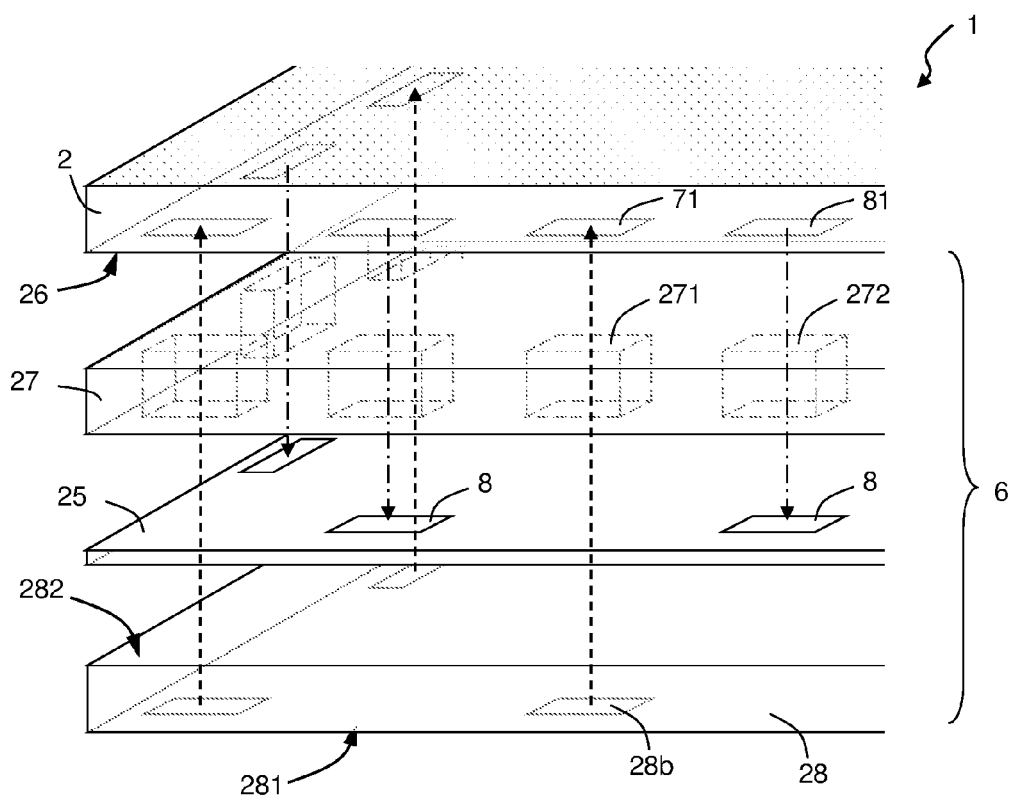
FIG. 12 is a perspective view of a corner portion of a TFT-LCD embodiment.

FIG. 12 shows another embodiment of the invention, implementing an LCD unit 6. The drawing shows a corner portion of a touch-sensing display panel 1, in which a number of elements have been vertically separated for the purpose of illustration only. Basically, the display panel 1 of this embodiment includes the LCD unit 6 and a light guide 2 which provides the touch-sensitive surface 3. At the bottom of the drawing, a backlight 28 is disposed. Light is injected into the backlight 28 from a light source (not shown), preferably through an incoupling arrangement designed to spread light within the light guide, as is well known in the art. In this embodiment the backlight 28 includes a light guide with at least one structured surface 281, functioning to lead out light upwards through the display layers. Typically it is the lower surface 281 which is structured, whereas light propagates by TIR in the upper surface of the backlight light guide 28, and preferably also in the lower surface 281 between structured areas thereof. The backlight 28 may also include a rear side reflector (not shown) for reflecting light, which escapes through the structured surface 281 of the light guide, back into the backlight light guide. Further details with regard to embodiments of the backlight 28 will now be outlined below with reference to FIGS. 13-19, before returning to the embodiment of FIG. 12.

Figure 13:
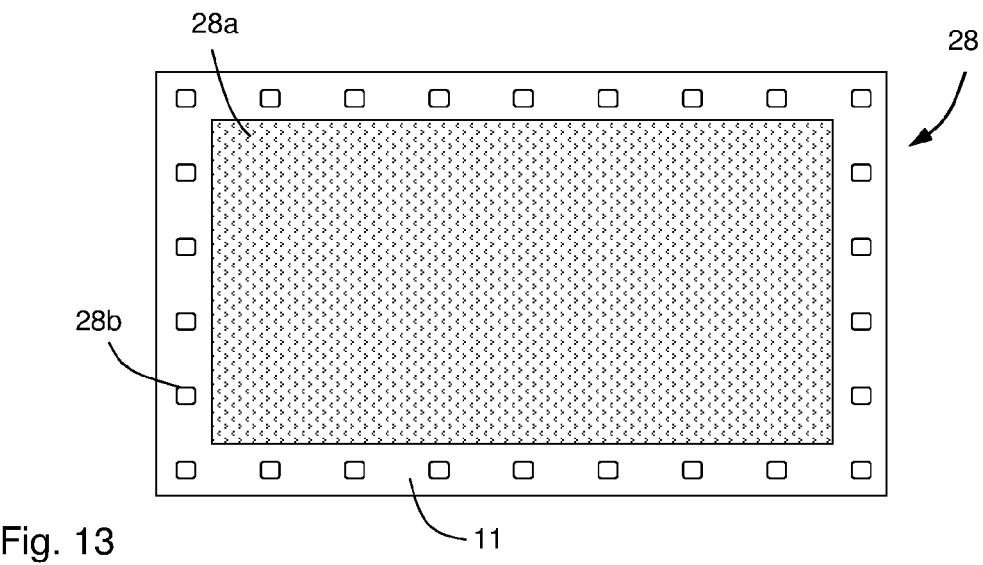
FIG. 13 is a top plan view of a backlight design for use in the TFT-LCD embodiment of FIG. 12.

FIG. 13 shows a plan view of the backlight 28, whereas FIGS. 14-19 show different ways of realizing the backlight 28. In the present embodiment, the backlight 28 is not only used for the image-forming pixels 10, but also as the light source of the emitters 7. For the first purpose, an area 28a representing the central region 12 of the lower surface 281 of the backlight 28 is structured to evenly spread light up through the upper surface 282 of the backlight 28. This is, as such, well-known technology frequently used in the art. Exact or detailed ways of structuring a surface of a backlight for this purpose will therefore not be outlined here, but typically the structured area 28a is designed with respect to where light is injected, such that not all light is leaked close to the light source. In addition to the central region structured area 28a, the backlight is also devised with a structured area 28b in the peripheral region 11. The structured area 28b preferably has a sequential design, such that light is leaked out at distinct places, where it is wanted, throughout the peripheral region 11. This way less light is wasted. In an alternative embodiment (not shown) also the peripheral region 11 may be devised with a more evenly dispersed structured area 28b, similar to the structured area 28a of the central region 12, and which light is to be led up is instead only defined by the pixel structure of the driving of the liquid crystals.

Figure 14:
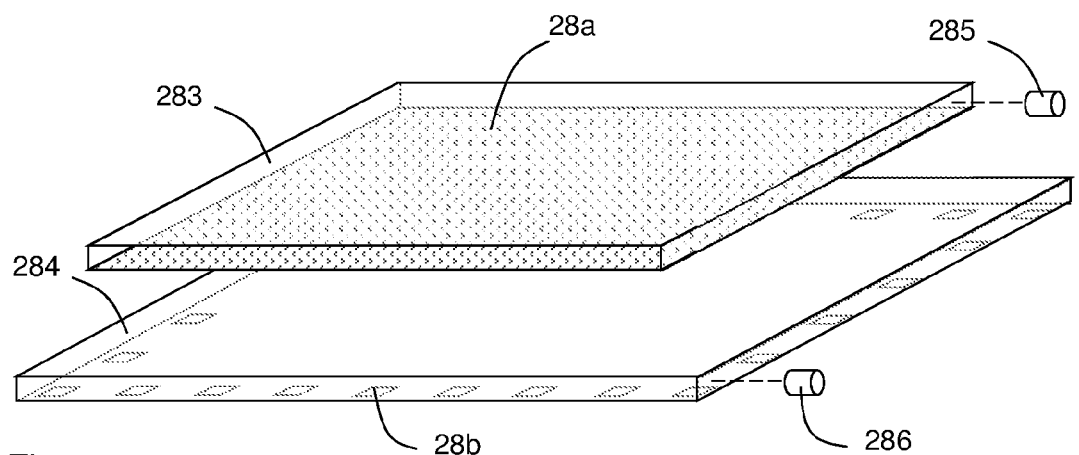
FIG. 14 shows a perspective view of a sandwiched embodiment of the backlight design of FIG. 13.

FIG. 14 shows one way of realizing the backlight 28. In this embodiment, the backlight 28 comprises two light guides; a central light guide 283 and a peripheral light guide 284, one disposed over the other in a sandwich structure. The two light guides 283, 284 may be configured with different refractive indexes for the wavelengths used, typically white light in the central region 12 and NIR in the peripheral region, so at to allow light to propagate by TIR in the respective light guides without leaking. In the drawing, the central light guide 283 is only about as wide as the central region 12, i.e. the imaging part of the display. In an alternative embodiment (not shown), the central light guide 283 may be just as wide as the peripheral light guide 284, yet only provided with its structured area 28a at the central region 12. Correspondingly, it may be noted that the peripheral light guide 284 is illustrated as an entire sheet covering the central region 12 too. However, an alternative design, which will be described with reference to FIGS. 15-18 below may include a peripheral light guide 284 that is frame-like, lacking a central portion. Such a frame-like light guide may be disposed around the central light guide 283. Such an embodiment would thus mean an arrangement where the two light guides 283 and 284 are arranged in the same plane rather than being sandwiched, which theoretically could entail a lower profile to the entire display panel 1.

FIG. 15 shows a plan view of one specific example of such an embodiment, in which a peripheral backlight light guide 284 is provided at two orthogonal sides in the peripheral region 11, where the emitters 7 are emulated. If only detectors 8, and no emitters 7, are present at the other two orthogonal sides in the peripheral region 11 around the central region 12, and the peripheral region 11 is covered by means of a cover frame 22, as shown in FIG. 10, there may not be any need for a backlight at those other sides of the peripheral region 11. In an alternative embodiment (not shown) the central backlight 283 extends into the peripheral region at the sides where no peripheral backlight is present, i.e. the lower and right sides of the central region 12 in FIG. 15.

FIG. 16 discloses the embodiment of FIG. 15 in a perspective view, and shows more clearly how the two light guides 283 and 284 are disposed at least partly in the same plane. Side edges of the two light guides may be prepared to be substantially reflective, e.g. by metallization, so as to conserve light, and not to leak light to each other. In this drawing, details of structured areas in the backlight are left out for the sake of simplicity, as are the light sources that are otherwise evident in exemplary form in FIG. 15.

FIG. 17 shows an alternative to the embodiment of FIGS. 15-16, in which separate outer light guides 284 are provided at the peripheral region for each side around the central region 12, and also with each one light source 286. As shown by means of the dashed example, one embodiment may include light guides 284 at even three or all four sides about the central region 12, if emitters 7 are emulated in those peripheral sections too.

FIG. 18 shows a variant, in which also all four peripheral sides 11 are covered by a light guide 284 disposed around, substantially enclosing, the central light guide 283. More than one light source 286 may be employed, even if there is only one peripheral light guide 284, in order to provide sufficient illumination within the entire peripheral light guide 284.

In the embodiments of FIGS. 14-18, separate light sources are employed for the different purpose; a VIS light source 285 for injecting white light into the central light guide 283, and a NIR light source 286 for injecting NIR light into the peripheral light guide 284. As is known by the skilled person, plural light emitters may be used for injecting light into a light guide, and the representation of one light source for each light guide shall therefore merely be seen as an example.

Figure 19:
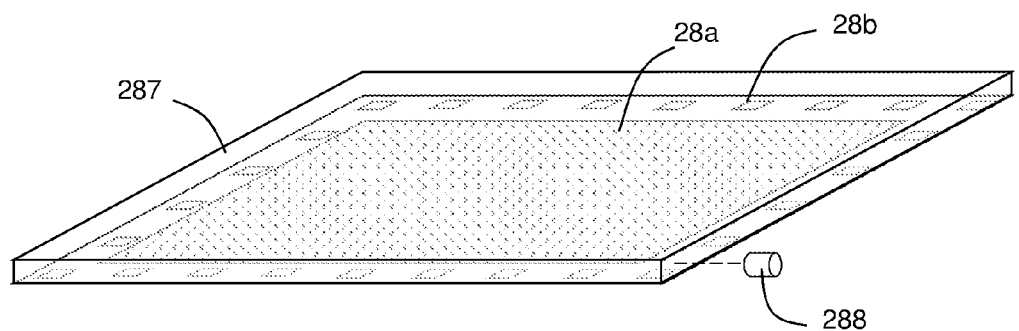
FIG. 19 shows a perspective view of an integrated embodiment of the backlight design of FIG. 13.

FIG. 19 shows an alternative embodiment, where one and the same light guide 287 is configured to be used for both purposes. A single light source 288 is shown, but as already explained it may comprise plural emitters. In any case, light is injected in the light guide 287 within wavelength ranges for use both as imaging backlight via the central structured area 28a and for FTIR purposes via the peripheral structured area 28b. The light source 288 may comprise a broad spectrum emitter, or may comprise several emitters devised to inject light in different wavelengths, such as VIS and NIR.

Returning to FIG. 12, starting from the bottom this drawing shows a display panel 1 comprising an LCD unit 6 and a light guide 2. The LCD unit 6, in turn, comprises a backlight 28, an electrode 25 including a lower polarizer, a liquid crystal layer 27, and an upper electrode 26 with an upper polarizer and color filters. The peripheral structured area 28b of backlight 28 is indicated, but the drawing leaves out the central structured area 28a for the sake of clarity. As indicated by the dashed vertical arrows, the peripheral structured area 28b serves to lead out light upwards in the structure. The backlight 28 may e.g. be designed in accordance with any of the embodiments described with reference to FIGS. 13-19. It should also be noted that the arrows are symbolic and that rather a cone of light will be led out in reality, as determined by the geometry of the backlight, and by any light-directing structures as described above, if present. The electrode 25 comprises a pixel-defining structure and a TFT active matrix. In operation together with the upper electrode 26 (indicated as a lower surface of the light guide 2), the electrode 25 is configured to define pixels in the intermediate liquid crystal (LC) layer 27. Also, the TFT active matrix connect to detectors 8, to read out sensed received light. Such detectors may e.g. be photo detectors, OLEDs or similar.

Preferably, the LC layer 27 is driven by a controller 41 using the electrodes 25, 26 according to a predetermined scheme such that the LC layer is opened at portions 271 over the structured area 28*b* in a certain pattern. In one embodiment, portions 271 are opened one by one in succession over each one structured area 28*b*, such that each portion 271 will serve as, or emulate, one emitter 7, which emitters 7 will act as flashed one by one. An incoupling arrangement 71 is configured at the rear surface 4 of the light guide, at which light is injected into the light guide 2. Emitter light is indicated in the drawing by means of dashed vertical arrows, from the structured area 28*b* to the light guide 2.

Once injected in the light guide 2, at least parts of the light will propagate by TIR in at least the front surface 3 to outcoupling structures 81 at the rear surface 4. Furthermore, the LC layer 27 is preferably driven by the controller 41 over the electrodes 25, 26 such that the LC layer 27 is held open, i.e. transmissive, at portions 272 over the detectors 8, below the outcoupling structures 81. This way, light coupled out from the light guide 2 is led to the detectors 8, as indicated by the vertical dash-dotted arrows.

Although this is not shown in this drawing, it has been outlined with respect to other embodiments that incoupling and outcoupling may be achieved simply by bypassing an optical layer 21 disposed under the light guide 2 over the image-forming pixels 10 in the central region 12. In addition, the incoupling 71 and outcoupling 81 structures may include diffusive and/or diffractive elements to direct light in or out of the light guide 2, as outlined above for different types of light-directing structures. It may be noted that the size of the portions 271 and 272 of the LC layer 27 need not be equally large, even though the drawing indicates this. Also, each such portion 271 and 272 is preferably made up of a plurality of pixels of the TFT active matrix and the LC layer 27.

While the invention has been described in connection with what is presently considered to be the most practical and preferred embodiments, it is to be understood that the invention is not limited to the disclosed embodiments, but on the contrary, is intended to cover various modifications and equivalent arrangements included within the scope of the appended claims. It should be noted that while certain features have been described in conjunction with different drawings, such features may well be combined in one and the same embodiment.

For example, it is conceivable that only the emitters 7 are integrated in the display unit 6, while the detectors 8 are otherwise installed in the display apparatus 40, e.g. as separate components.

In certain embodiments, the display unit 6 may comprise only one emitter 7 in combination with plural detectors 8, or only one detector 8 in conjunction with plural emitters 7. It is even conceivable that the display unit 6 has only one emitter 7 and one detector 8, e.g. to detect the presence of a touching object 5 on the touch surface 3.

As noted above, it may be desirable that the surface area of the emitters and detectors is larger than the surface area of the pixels. It is to be understood that the emitters may be larger than the detectors, and vice versa, and also that the emitters and detectors may have any shape, including circular, elliptical, and polygonal.

The invention claimed is:

1. A touch-sensing display panel, comprising:
    an LCD unit including a backlight and a plurality of image-forming pixel elements arranged in a central region;
    a planar light guide with a first refractive index, the planar light guide having a front surface forming a touch-sensing region and an opposite rear surface facing the LCD unit;
    pixel elements arranged at a peripheral region of the LCD unit, the pixel elements optically coupled to the planar light guide to allow light from the backlight to pass into the planar light guide for propagation therein through total internal reflection; and
    a plurality of light detectors configured to receive light from the planar light guide.

2. The touch-sensing display panel of claim 1, wherein said backlight is configured to pass light in the visible range to the plurality of image-forming pixel elements, and to pass light in the infrared radiation (IR) range to at least first selected portions of the peripheral region.

3. The touch-sensing display panel of claim 1, wherein said backlight comprises:
    a backlight light guide; and
    a light source configured to inject light within the visible range and within the IR range to the backlight light guide.

4. The touch-sensing display panel of claim 3, wherein said backlight comprises:
    a common backlight light guide configured to pass light in both the visible range and in the IR range.

5. The touch-sensing display panel of claim 1, wherein said backlight includes structured areas configured to selectively leak out light.

6. The touch-sensing display panel of claim 1, comprising:
    an optical layer at the opposite rear surface of the planar light guide, said optical layer covering the plurality of the image-forming pixel elements in at least the central region, wherein
        said optical layer is configured to reflect at least a part of the light impinging thereon from within the planar light guide.

7. The touch-sensing display panel of claim 6, wherein said optical layer has a second refractive index, which is lower than the first refractive index.

8. The touch-sensing display panel of claim 6, wherein said optical layer is an air gap.

9. The touch-sensing display panel of claim 6, wherein said optical layer is a coating.

10. The touch-sensing display panel of claim 6, wherein the light bypasses said optical layer.

11. The touch-sensing display panel of claim 6, wherein said plurality of light detectors are coupled to receive light from the planar light guide; and
    the light bypasses said optical layer.

12. The touch-sensing display panel of claim 1, wherein said LCD unit comprises:
    a TFT electrode layer connected to said plurality of light detectors.

13. The touch-sensing display panel of claim 1, wherein pixel elements of second selected portions of a peripheral region of the LCD unit are configured to pass light from the planar light guide to said plurality of light detectors.

14. The touch-sensing display panel of claim 1, wherein a grid of propagation paths is defined across the touch-sensing region between pairs of light emitters and light detectors.

15. An electronic device comprising the touch-sensing display panel of claim 1, and a controller connected to the LCD unit, the controller configured to cause pixel elements of first selected portions of the peripheral region to open in a pattern.

16. The electronic device of claim 15, wherein said controller is further configured to cause the pixel elements to open in succession.

17. The touch-sensing display panel of claim 1, further comprising:
an incoupling arrangement configured to couple the light from the backlight into the planar light guide for propagation therein through total internal reflection.

18. A touch-sensing display panel, comprising:
an LCD unit including a backlight and a plurality of image-forming pixel elements arranged in a central region;
a planar light guide with a first refractive index, the planar light guide having a front surface forming a touch-sensing region and an opposite rear surface facing the LCD unit;
a plurality of light emitters, emulated by passing light from the backlight through pixel elements of first selected portions of a peripheral region of the LCD unit into the planar light guide for propagation therein through total internal reflection; and
a plurality of light detectors configured to receive light from the planar light guide;
wherein said backlight includes
a backlight light guide arrangement,
a first light source configured to inject light within the visible range into the backlight light guide arrangement, and
a second light source configured to inject light within the IR range into the backlight light guide arrangement.

19. The touch-sensing display panel of claim 18, wherein said backlight light guide arrangement comprises:
a first backlight light guide connected to the first light source; and
a second backlight light guide connected to the second light source.

20. The touch-sensing display panel of claim 19, wherein the first backlight light guide covers at least said central region, and the second backlight light guide covers at least a portion of said peripheral region.

21. The touch-sensing display panel of claim 19, wherein the first backlight light guide and the second backlight light guide are in different layers.

22. The touch-sensing display panel of claim 19, wherein the second backlight light guide is at least partly outside of the first backlight light guide in a common plane.

23. A touch-sensing display panel, comprising:
an LCD unit including a backlight and a plurality of image-forming pixel elements arranged in a central region;
a planar light guide with a first refractive index, the planar light guide having a front surface forming a touch-sensing region and an opposite rear surface facing the LCD unit;
a plurality of light emitters, emulated by passing light from the backlight through pixel elements of first selected portions of a peripheral region of the LCD unit into the planar light guide for propagation therein through total internal reflection;
a plurality of light detectors connected to receive light from the planar light guide; and
an optical layer at the opposite rear surface of the planar light guide, said optical layer covering the plurality of the image-forming pixel elements in at least the central region, wherein
said optical layer has a second refractive index,
said optical layer is configured to reflect at least a part of the light from the plurality of light emitters impinging thereon from within the planar light guide, and
an extension portion of the optical layer is over the plurality of light emitters, said extension portion having a third refractive index, which is higher than the second refractive index.

24. The touch-sensing display panel of claim 23, wherein the third refractive index is greater than or equal to the first refractive index.

25. The touch-sensing display panel of claim 23, wherein the extension portion of the optical layer is also over the plurality of light detectors.

* * * * *